(12) United States Patent
Berard et al.

(10) Patent No.: US 8,957,270 B2
(45) Date of Patent: Feb. 17, 2015

(54) PROCESS FOR THE PRODUCTION OF A FUEL BASE FROM AN ETHYLENE FEEDSTOCK IMPLEMENTING AT LEAST ONE OLIGOMERIZATION STAGE IN THE PRESENCE OF A HOMOGENEOUS CATALYTIC SYSTEM

(75) Inventors: Sandrine Berard, Communay (FR); Stephane Harry, Jardin (FR); Natacha Touchais, Vienne (FR); Lionel Magna, Lyons (FR); Helene Olivier-Bourbigou, Saint Genis-Laval (FR); Cedrik Popelin, Mornant (FR); David Proriol, Brignais (FR); Lucien Saussine, Croissy sur Seine (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 914 days.

(21) Appl. No.: 13/102,593

(22) Filed: May 6, 2011

(65) Prior Publication Data

US 2011/0282119 A1 Nov. 17, 2011

(30) Foreign Application Priority Data

May 6, 2010 (FR) ..................................... 10 01953

(51) Int. Cl.
*C07C 2/22* (2006.01)
*C10G 50/00* (2006.01)
(52) U.S. Cl.
CPC ........ *C10G 50/00* (2013.01); *C10G 2300/1011* (2013.01); *C10G 2300/703* (2013.01); *C10G 2400/04* (2013.01); *C10G 2400/08* (2013.01)
USPC ........... 585/517; 585/312; 585/313; 585/324; 585/326; 585/329; 585/502; 585/520; 585/521; 585/522; 585/523; 585/524

(58) Field of Classification Search
CPC ............................ C10G 50/00; C10G 23/1011
USPC ......... 585/517, 520, 521, 522, 523, 524, 313, 585/312, 324, 326, 329
See application file for complete search history.

(56) References Cited

U.S. PATENT DOCUMENTS

| | | | |
|---|---|---|---|
| 4,486,615 A * | 12/1984 | Langer, Jr. .................. | 585/523 |
| 4,891,457 A | 1/1990 | Owen et al. | |
| 6,221,986 B1 * | 4/2001 | Commereuc et al. ......... | 526/160 |
| 6,444,866 B1 | 9/2002 | Commereuc et al. | |

(Continued)

FOREIGN PATENT DOCUMENTS

| | | |
|---|---|---|
| EP | 0 215 609 B1 | 3/1987 |
| GB | 2 326 885 A | 1/1999 |
| WO | WO 2004/026795 A2 | 4/2004 |

OTHER PUBLICATIONS

Krause, et al., "Aluminum Compounds, Organic" in Ullmann's Encyclopedia of Industrial Chemistry, Wiley-VCH, 2002, available on-line Jun. 15, 2000.*

(Continued)

*Primary Examiner* — Thuan D Dang
*Assistant Examiner* — Bradley Etherton
(74) *Attorney, Agent, or Firm* — Millen, White, Zelano & Branigan, P.C.

(57) ABSTRACT

A process for producing a base for a fuel from a C2 ethanol feedstock, by a first stage for oligomerization of the feedstock into a hydrocarbon effluent that contains a mixture of olefins for the most part having between 4 and 30 carbons, and contains a C10-C24 fraction that has a mean linearity that is greater than 60%, in the presence of a homogeneous catalytic system that contains a metal precursor of titanium, zirconium, hafnium, nickel and/or iron, a second stage for oligomerization of a portion of the effluent that is obtained from stage a), into a hydrocarbon effluent that contains a mixture of olefins for the most part having between 4 and 30 carbon atoms, and containing a C10-C24 fraction that has a mean linearity that is less than 50%, in the presence of a homogeneous catalytic system.

20 Claims, 1 Drawing Sheet

(56) References Cited

U.S. PATENT DOCUMENTS

| | | | |
|---|---|---|---|
| 6,534,691 B2* | 3/2003 | Culver et al. | 585/527 |
| 2003/0153798 A1* | 8/2003 | Kobayashi et al. | 585/517 |
| 2003/0171632 A1* | 9/2003 | Du Toit | 585/533 |
| 2009/0299109 A1* | 12/2009 | Gruber et al. | 585/14 |
| 2009/0306449 A1* | 12/2009 | Aliyev et al. | 585/523 |

OTHER PUBLICATIONS

Search Report of FR 1001953 (Jan. 25, 2011).

C. Carlini et al., "Catalytic Performances of Homegeneous Systems Based on—Nitroacetophenonate-Nickel(II) Complexes and Organoaluminium Compounds in Ethylene Oligomerisation", Applied Catalysis A: General, vol. 216 (2001) pp. 1-8.

K. Radhakrishnan et al., "Influence of Alkylaluminium Activators and Mixtures Thereof on Ethylene Polymerization with a Tridentate Bis(imino)Pyridinyliron Complex", Macromol. Rapid Commun., vol. 24 (2003) pp. 251-254.

Y. Shiraki et al., "ZrCl4-TEA-EASC Three-Component Catalyst for the Oligomerization of Ethylene: The Role of Organoaluminum Co-Catalysts and Additives", Journal of Molecular Catalysis A: Chemical, vol. 187 (2002) pp. 283-294.

* cited by examiner

PROCESS FOR THE PRODUCTION OF A FUEL BASE FROM AN ETHYLENE FEEDSTOCK IMPLEMENTING AT LEAST ONE OLIGOMERIZATION STAGE IN THE PRESENCE OF A HOMOGENEOUS CATALYTIC SYSTEM

The oligomerization of light olefins that have three to five carbon atoms obtained primarily from FCC or hydrocracking has been used for the production of bases for fuels that make up a small portion of fuel pools (gasoline, jet fuel, and engine diesel fuel).

Most of the industrialized processes employ acidic heterogeneous catalysts: Catpoly, Polynaphtha, and the Octol processes are essentially dedicated to the production of gasoline, the MOGD process to that of middle distillate, and the SPGK of Shell can be oriented as desired to the production of gasoline or middle distillates.

For the dimersol process of Axens, Ziegler-type, nickel-based homogeneous catalysts have been applied primarily to the oligomerization of propylene and C3/C4 mixtures, as well as to the oligomerization of ethylene and C2/C3 mixtures (FCC off-gas) only for the production of gasoline. (a) Chemistry and Industry, May 1974, 375, Y. Chauvin, J. Gaillard, D. V. Quang, J. W. Andrews. b) Hydrocarbon Processing, May 1982, 110-112. Y. Chauvin, J. F. Gaillard, J. Leonard, P. Bonnifay, J. W. Andrews). In this case, the intervention of the coordination catalysis makes possible a good reactivity of the ethylene contrary to what is observed with acid catalysis.

To obtain a good-quality gasoline, a high level of branching of the olefin is necessary because the octane number of olefins and paraffins increases with the level of branching.

In contrast, for the production of a base for diesel fuel, it is necessary to hydrogenate the mixture of oligomers, and a low level of branching is preferable because the cetane number of paraffins decreases when the branching level increases. However, a certain level of branching is necessary to obtain good cold properties and in particular adequate cold fluidity. This point is also particularly critical for the production of products intended for the production of kerosene.

There are thus several processes for oligomerization of ethylene that implement homogeneous catalytic systems, whereby these processes are dedicated to the production of linear alpha-olefins that are used, based on their chain length, as intermediate products for chemical applications (Lappin, G. R.; Sauer, J. D. (1989) Alphaolefins Applications Handbook; Marcel Decker, Inc.: Berkeley, Calif.). These processes lead to more or less broad olefin distributions, with the C10-C24 fraction representing only a portion of the oligomers (approximately 40% maximum according to the calculations made from the Schulz-Flory distribution law).

With these products being linear, it is not conceivable to use them for the production of a diesel fuel and/or kerosene fuel directly after hydrogenation.

In the prior art, there is no process for oligomerization of ethylene that implements a homogeneous catalytic system and that makes possible the production of a fuel base that can be incorporated in a middle distillate-type fuel, i.e., diesel fuel and/or kerosene. However, the limitations of acidic solid catalysts relative to their reactivity with ethylene are known. In contrast, the homogeneous catalysts are very reactive with ethylene and lead to very significant productivities of higher olefins. However, these processes for oligomerization of ethylene generally lead to olefins whose linearity makes them difficult to use for producing bases that can be incorporated in a diesel- and/or kerosene-type fuel.

One object of this invention is to provide a process for the production of middle distillate hydrocarbon bases that can be incorporated into the fuel pool (diesel and/or kerosene) with maximized yields, starting from a C2 ethylene fraction, whereby said C2 fraction is preferably produced from a feedstock that is obtained from a renewable source. The process according to the invention implements a series of stages comprising two oligomerization stages that are catalyzed by a homogeneous catalytic system, with a stage for draining ethylene being optionally implemented between the two oligomerization stages.

Another objective of this invention is to provide a process for production of diesel and/or kerosene hydrocarbon bases that have a good cetane number as well as good cold properties.

This invention describes a process for the production of bases for fuels (diesel and/or kerosene type) from a C2 ethylene feedstock, whereby said process comprises at least a first stage for oligomerization of said feedstock into at least one hydrocarbon effluent that comprises a mixture of olefins that for the most part have a carbon number of between 4 and 30, whereby said olefin mixture comprises a C10-C24 fraction that has a mean linearity that is greater than 60%, in the presence of a homogeneous catalytic system that comprises at least one metal precursor that is selected from among the group that is formed by titanium, zirconium, hafnium, nickel and iron, taken by themselves or in a mixture, a second stage for oligomerization of at least a portion of the effluent that is obtained from stage a), into at least one hydrocarbon effluent that comprises a mixture of olefins that for the most part have between 4 and 30 carbon atoms, whereby said olefin mixture comprises a C10-C24 fraction that has a mean linearity that is less than 50%, in the presence of a homogeneous catalytic system that is identical to or different from the one that is used in stage a).

The feedstock that is used in the process according to the invention is a C2 ethylene feedstock that can advantageously come from a steam-cracking unit, an FCC unit, or a Fischer-Tropsch synthesis unit.

The term FCC refers to a process for catalytic cracking in a fluidized bed of petroleum fractions with a boiling point that is greater than approximately 350° C., for example a vacuum distillate, optionally deasphalted oil or an atmospheric residue. In the case where the feedstock that is used in the process according to the invention comes from an FCC unit, the C2 fraction that comprises compounds that have two carbon atoms of the effluent of the FCC comprises ethylene and ethane as well as other C2 compounds, such as, for example, acetylene. Said C2 fraction that is obtained from an FCC unit is preferably pre-treated before being used in the process according to the invention.

Steam-cracking is a process that consists in producing olefins by thermal cracking of paraffinic hydrocarbons in the presence of water. Steam-cracking produces important intermediate products of petrochemistry: ethylene, propylene, butenes, butadiene and benzene.

The Fischer-Tropsch synthesis can also make it possible to produce, i.a., olefins, including ethylene, from synthesis gas, which can come from fossil resources (carbon, gas . . . ) but also for gasification of renewable resources. For example, the Fischer-Tropsch processes that are catalyzed by high-temperature iron systems are known for leading to olefin-rich light fractions. The synthetic gas can also be converted into methanol or ethanol, with the ethanol able to generate ethylene by dehydration.

Said feedstock can also advantageously come from non-fossil resources. So as to make the consumption of petroleum unnecessary and to reduce the consumption of energy, the feedstock according to the invention can also come from non-fossil resources, i.e., renewable sources such as those obtained from cultivating vegetables.

In the case where the feedstock comes from renewable sources, the C2 ethylene feedstock can advantageously result from the dehydration of ethanol that is produced from a renewable source that is obtained from the biomass that is also called bioethanol. The synthesis of bioethanol can advantageously be carried out by fermentation of at least three sources: 1) sucrose from cane sugar or beet scraps, 2) starch that is present in grains and tubers, and 3) the cellulose and hemicellulose present in wood, grasses and other lignocellulosic biomasses, starch, with cellulose and hemicellulose having to be hydrolyzed into sugars before undergoing a fermentation stage.

The plant material employed in the production of ethanol is first advantageously pretreated and hydrolyzed according to processes for pretreatment and hydrolysis of the biomass that are well known to one skilled in the art. The stages of fermentation of the plant material into ethanol are also well known. They can advantageously implement one or more yeasts and are advantageously followed by a distillation that makes it possible to recover ethanol in aqueous form.

The stage for dehydration of ethanol that is optionally produced from a renewable source obtained from biomass, also called bioethanol, is advantageously implemented as described in ("Ethylene from Ethanol," N. K. Kochar, R. Merims, and A. S. Padia, CEP, June 1981) and in the U.S. Pat. No. 4,232,179, U.S. Pat. No. 4,396,789, U.S. Pat. No. 4,234,752, U.S. Pat. No. 4,396,789, and U.S. Pat. No. 4,698,452.

In the case where the C2 ethylene feedstock that is used in the process according to the invention comes from the dehydration of ethanol produced from a renewable source that is obtained from biomass, the ethylene that is obtained by dehydration of ethanol preferably undergoes a stage for purification before being used in the process according to the invention in such a way as to eliminate the impurities and at least a portion and preferably all of the oxidized compounds that are present in said C2 ethylene fraction and to limit the deactivation of the homogeneous catalyst for oligomerization that is placed downstream.

The purification stage is advantageously implemented by means that are known to one skilled in the art, such as, for example, the use of at least one resin, columns for washing with water, columns for washing with soda, for adsorption on solid selected from among molecular sieves, active carbon, alumina and zeolites, distillation, hydrogenation in the presence of a nickel-based catalyst, and absorption by a solvent (ionic liquid, or the like) so as to obtain a purified feedstock that corresponds to the level of impurities that are compatible with the homogeneous catalyst for oligomerization that is placed downstream, whereby this list is not exhaustive.

Regardless of the source from which the C2 ethylene feedstock is obtained, said feedstock is preferably purified in such a way that the C2 ethylene feedstock that is obtained corresponds to the specifications of a C2 feedstock of polymer grade type.

In a general manner, oligomerization is the addition of n identical and/or different olefins. Oligomerization is distinguished from polymerization by an addition of molecules in a limited number, with the number n being, according to the invention, for the largest portion by weight, at least of the oligomers, between 2 and 60, and preferably between 2 and 40.

In accordance with stage a) of the process according to the invention, said C2 ethylene feedstock undergoes a first oligomerization stage into at least one hydrocarbon effluent that comprises a mixture of olefins that for the most part have between 4 and 30 carbons, whereby said olefin mixture comprises a C10-C24 fraction, and said fraction has a mean linearity that is greater than 60%, and preferably greater then 65%, in the presence of a homogeneous catalytic system that comprises at least one transition metal that is selected from among the group that is formed by titanium, zirconium, hafnium, nickel and iron, taken by themselves or in a mixture.

Throughout the rest of the text, mixture of olefins that for the most part have between 4 and 30 carbons is defined as an olefin mixture that comprises at least 50% by weight, preferably at least 60% by weight, and in a preferred manner at least 70% by weight, of olefins that have between 4 and 30 carbon atoms, whereby the percentages are expressed in terms of percentage by weight relative to the total mass of the olefin mixture.

In the same way, throughout the rest of the text, C10-C24 fraction is defined as a mixture of olefins that have between 10 and 24 carbons.

Preferably, said hydrocarbon effluent that is obtained from the first oligomerization stage comprises at least 50%, and preferably at least 70%, by weight of a mixture of olefins that for the most part have between 4 and 30 carbon atoms, whereby the percentages are expressed in terms of percentage by weight relative to the total mass of the hydrocarbon compounds that are present in said hydrocarbon effluent.

Preferably, said mixture of olefins that have between 4 and 30 carbons comprises less than 40% by weight and preferably less than 35% by weight of a mixture of olefins that have between 10 and 24 carbon atoms (C10-C24 fraction), whereby the percentages are expressed in terms of percentage by weight relative to the total mass of the olefins that are present in said mixture. The make-up to 100% comprises C4-C10 and C24-C30 fractions.

In accordance with the first oligomerization stage of the process according to the invention, the olefin mixture obtained from said stage comprises a C10-C24 fraction that has a mean linearity that is greater than 60% and preferably greater than 65%.

Mean linearity that is expressed in terms of percentage is defined as the ratio of the percentage of linear olefins that are present in the C10-C24 fraction to the total percentage of olefins that are present in the C10-C24 fraction.

The measurement of the linearity is made by gas phase chromatography on the C10-C24 fraction after hydrogenation of said C10-C24 fraction.

The first oligomerization stage a) of the C2 ethylene feedstock is implemented by homogeneous catalysis, i.e., the catalyst is soluble in the oligomerization products for forming a single liquid phase.

Preferably, the homogeneous catalytic system that is used in the first oligomerization stage a) comprises at least one metal precursor that is selected from among the group that is formed by titanium, zirconium, hafnium, nickel and iron, taken by themselves or in a mixture, and at least one activator that is preferably selected from the group that is formed by tris(hydrocarbyl)aluminum, hydrocarbyl aluminum halides, and preferably chlorinated or brominated compounds of hydrocarbyl aluminum, and aluminoxanes, tris(hydrocarbyl) aluminum, and the hydrocarbyl aluminum halides that preferably correspond to the general formula $AlR''_n Y_{3-n}$, in which R'' represents a monovalent hydrocarbon radical that contains, for example, up to 12 carbon atoms, such as alkyl, aryl, aralkyl, alkaryl or cycloalkyl; Y represents a halogen atom that is preferably selected from among chlorine and bromine and is preferably a chlorine atom, with n able to assume a value of 0 to 3.

The tris(hydrocarbyl)aluminum and the hydrocarbyl aluminum halides that correspond to the general formula $AlR''_n Y_{3-n}$ are preferably selected from among the ethyl aluminum sesquichloride (EASC), dichloroethyl aluminum (EADC), dichloroisobutyl aluminum, chlorodiethyl aluminum (DEAC), triethyl aluminum (TEA), and trimethyl aluminum (TMA). These activators can be used by themselves or in a mixture.

The aluminoxanes are preferably selected from among methylaluminoxane (MAO) or modified methylaluminoxane (MMAO), taken by themselves or in a mixture.

Said homogeneous catalytic system that is used in the first oligomerization stage a) can optionally also comprise at least one additive that is selected from among the Bronsted acid compounds, the Lewis bases and acids, the electron donor organic compounds that contain at least one oxygen or a nitrogen or a phosphorus or a sulfur that is mono- or polyfunctional. By way of example, it is possible to cite amines, imines, carboxylic acids, acetals, cetals, ethers or alcohols.

Preferably, the homogeneous catalyst that is used in the first oligomerization stage a) comprises at least one metal precursor that is selected from among titanium, zirconium, nickel and iron, taken by themselves or in a mixture. In a very preferred manner, the homogeneous catalytic system that is used in the oligomerization stage a) comprises a metal precursor that is based on zirconium or iron.

In the very preferred embodiment where the metal precursor that is used in the first oligomerization stage a) is based on nickel, the homogenous catalytic system is advantageously implemented for the method for preparation of the homogeneous catalytic system as described in the teaching of patents U.S. 2008,033,224, U.S. Pat. No. 7,235,703 and U.S. Pat. No. 4,362,650. Preferably, said homogeneous catalytic system comprises at least one bivalent nickel compound, at least one hydrocarbyl aluminum halide, and preferably a chlorinated or brominated hydrocarbyl aluminum compound that is selected from among ethyl aluminum sesquichloride (EASC), dichloroethyl aluminum (EADC), dichloroisobutyl aluminum, and chlorodiethyl aluminum (DEAC) as an activator, and optionally at least one organic compound or a Bronsted acid as an additive.

The nickel-based metal precursors that can be used according to the invention are preferably nickel carboxylates of general formula $(R_1COOO)_2Ni$, where $R_1$ is a hydrocarbyl radical, for example alkyl, cycloalkyl, alkenyl, aryl, aralkyl or alkaryl, containing up to 20 carbon atoms, preferably a hydrocarbyl radical of 5 to 20 carbon atoms. The radical $R_1$ can be substituted by one or more halogen atoms, hydroxy-, ketone-, nitro-, or cyano groups, or other groups that do not disrupt the reaction. The two radicals $R_1$ can also constitute an alkylene radical with 6 to 18 carbon atoms. Nonlimiting examples of nickel compounds are the following bivalent nickel salts: octoate, ethyl-2 hexanoate, decanoate, stearate, oleate, salicylate, hydroxydecanoate. Nickel di-ethyl-2-hexanoate is preferably used.

The Bronsted acid compound corresponds to the formula HY, where Y is an organic anion, for example carboxylate, sulfonate or phenolate. The acids whose $pK_a$ at 20° C. is at most equal to 3, more particularly those that are more soluble in the nickel compound or in its solution in a hydrocarbon or another suitable solvent, are preferred. A preferred class of acids comprises the group that is formed by the halogenocarboxylic acids of formula $R_2COOH$ in which $R_2$ is a halogenated alkyl radical, in particular those that contain at least one alpha-halogen atom of the group —COOH with a total of 2 to 10 carbon atoms. A halogenoacetic acid of formula $CX_pH_{3-p}$—COOH in which X is fluorine, chlorine, bromine or iodine, with p an integer of 1 to 3, is preferably used. By way of example, it is possible to cite the following acids: trifluoroacetic, difluoroacetic, fluoroacetic, trichloroacetic, dichloroacetic, and chloroacetic. These examples are not limiting, and it is also possible to use arylsulfonic-, alkylsulfonic- and fluoroalkylsulfonic acids, picric acid, and nitroacetic acid. Preferably, trifluoroacetic acid is used.

In the very preferred embodiment where the metal precursor that is used in first oligomerization a) is based on zirconium, the homogeneous catalytic system is advantageously employed for the method of preparation of the homogeneous catalytic system as described in the teaching of patent FR 2 693 455. Preferably, said homogeneous catalytic system comprises at least one zirconium compound, at least one compound of the aluminum as activator as described above, and optionally at least one organic compound as an additive. The zirconium-based metal precursors can advantageously be selected from among the zirconium halides, such as zirconium tetrachloride $ZrCl_4$, zirconium tetrabromide $ZrBr_4$, alcoholates such as zirconium tetrapropylate $Zr(OC_3H_7)_4$, zirconium tetrabutylate $Zr(OC_4H_9)_4$, carboxylates such as zirconium tetra-ethyl-2-hexanoate $Zr(OCOC_7H_{15})_4$, or oxo-carboxylates, such as dizirconium 1-oxo-hexaethyl-2-hexanoate $[Zr(OCOC_7H_{15})_3]_2O$.

The organic compounds that are used as additive are advantageously selected from among the class of acetals and cetals. It is possible to cite the following by way of examples: diethoxymethane, diisopropoxymethane, diethoxy-1,1-ethane, diisobutoxy-1,1-ethane, dimethoxy-1,1-decane, nonyl-2-dioxolane-1,3, dimethoxy-2,2-propane, dibutoxy-2,2-propane, dioctoxy-2,2-propane, di(2-ethylhexyloxy)-2,2-propane, dimethoxy-2,2-octane, and dimethoxy-1,1-cyclohexane.

In the very preferred embodiment where the metal precursor that is used in the first oligomerization stage a) is based on titanium, the homogeneous catalytic system is advantageously implemented for the method of preparation of the homogeneous catalytic system as described in the teaching of U.S. Pat. No. 3,660,519, U.S. Pat. No. 3,879,485, FR 8315041, U.S. Pat. No. 3,584,071, and EP 0,722,922 B1. Preferably, said homogeneous catalytic system comprises at least one titanium compound, at least one aluminum compound as activator as described above, and optionally at least one organic compound as additive. The titanium-based metal precursors can advantageously be selected from among the compounds that correspond to the general formula $X_nTi(OR)_{4-1}$ in which X is a chlorine atom, a bromine atom, a hydrocarbyl radical that comprises 1 to 30 carbon atoms, or a radical that is selected from the group that is formed by the amidos $R'_2N^-$, the carboxylates $R'COO^-$, where R' is a hydrocarbyl radical that comprises 1 to 30 carbon atoms, or else a cyclopentadienyl ligand that may or may not be substituted. n can assume the whole values of 0 to 4. The radical —OR is an organic compound that is selected from the family of aryloxy or alkoxy ligands, optionally substituted by aryl or aralkyl groupings or by heteroatoms.

The organic compounds that are used as additive are advantageously selected from the electron donor organic compounds that contain at least one oxygen or a nitrogen or a phosphorus or a sulfur. It is possible to cite tetrahydrofuran or dibutyl ether without being limiting.

In the very preferred embodiment where the metal precursor that is used in the first oligomerization stage a) is based on iron, the homogeneous catalytic system is advantageously implemented for the mode of preparation of the homogenous catalytic system as described in the teaching of the patents WO99/02472, WO 02/06192 A1, and WO2005/080301A1 or in the publications of V. Gibson, Chem. Rev. 2007, 107, 1745 or Britovek et al., Chem. Eur. J., 2000, 6, 12, pp. 2221-2231. Preferably, said homogeneous catalytic system comprises at least one complex of iron, at least one compound of aluminum as an activator, and optionally at least one organic compound as additive. The iron-based metal precursors can advantageously be selected from among $FeCl_2$; $FeCl_2, 4H_2O$; $FeCl_2$, 1.5THF; $FeCl_2$, 2-pyridine; $FeBr_2$; $Fe(CH_3COO)_2$; $Fe(CH_3COO)_2$; $Fe(C_6H_5N)_2(CH_2SiMe_3)_2$; $Fe(NO_3)_2$; $Fe(CF_3SO_3)_2$; Fe(ethyl-2-hexanoate)$_2$, and Fe(II) or Fe(III) bis(imino)pyridine complexes.

The activating agent is advantageously selected from among the compounds of aluminum and is preferably an aluminoxane that is selected from among methylaluminoxane (MAO) or modified methylaluminoxane (MMAO), taken by themselves or in a mixture.

The first oligomerization stage a) therefore makes possible, by the use of the homogeneous catalytic system described above, the production of a hydrocarbon effluent that comprises a C10-C24 fraction whose high mean linearity does not allow its incorporation into the fuel bases of diesel and/or kerosene type. Furthermore, the yield of the C10-C24 fraction that can optionally be incorporated into the kerosene and/or diesel fuel bases at the end of the first oligomerization stage a) remains low.

The second oligomerization stage b) therefore has as an objective to promote the shift of the distribution of olefins to the C10-C24 fraction and to reduce its mean linearity.

In accordance with the second stage b) of the process according to the invention, at least a portion and preferably all of the effluent that is obtained from stage a) is sent into a second oligomerization stage b) for producing at least one hydrocarbon effluent that comprises a mixture of olefins that for the most part have between 4 and 30 carbon atoms, whereby said olefin mixture that comprises a C10-C24 fraction has a mean linearity that is less than 50%, in the presence of a homogeneous catalytic system that is identical to or different from the one that is used in stage a).

Preferably, said hydrocarbon effluent that is obtained from the second oligomerization stage b) comprises at least 50% and preferably at least 70% by weight of a mixture of olefins that for the most part have between 4 and 30 carbons, whereby the percentages are expressed in terms of percentage by weight relative to the total mass of the hydrocarbon compounds that are present in said effluent.

Preferably, said mixture of olefins that for the most part have between 4 and 30 carbon atoms comprises at least 45% by weight and preferably at least 50% by weight of a mixture of olefins that for the most part have between 10 and 24 carbon atoms (C10-C24 fraction), whereby the percentages are expressed in terms of percentage by weight relative to the total mass of the olefins that are present in said mixture.

In accordance with the second oligomerization stage b) of the process according to the invention, the olefin mixture that is obtained from said stage comprises a C10-C24 fraction exhibiting a mean linearity that is less than 50% and preferably less than 40%.

In a preferred variant of the process, a stage for draining the ethylene is implemented between the first and second oligomerization stages a) and b). The hydrocarbon effluent that is obtained from the first stage a) advantageously undergoes a stage for draining the ethylene in such a way as to produce at least one effluent that comprises a residual quantity of ethylene that is advantageously less than 5% by weight and preferably less than 1% by weight relative to the total mass of the hydrocarbons that are present in said effluent.

This stage for draining ethylene is advantageously implemented by any means that stops the introduction of ethylene. Thus, the ethylene that is not reacted during the first oligomerization stage a) and that is present in the effluent that is obtained from the first oligomerization stage a) is consumed, because of its strong reactivity, for forming olefins with a higher boiling point. In the case of an intermittent process, drainage is advantageously implemented by closing the ethylene supply valve in the first oligomerization stage a). The pressure within the reactor of the first oligomerization stage a) decreases to become stable, which is a sign of the consumption of the residual ethylene in favor of olefins with higher molecular weight.

In the case of a continuous process, the effluent that is obtained from the first oligomerization stage a) is advantageously sent into a tubular reactor without supplementary addition of ethylene. The length of this reactor is advantageously long enough to make possible the consumption of ethylene, not reacted during the first oligomerization stage a) and dissolved in said effluent in favor of olefins with a higher boiling point.

Surprisingly enough, this drainage of ethylene makes it possible to significantly increase the quantity of the C10-C24 olefin fraction that is produced during the second oligomerization stage b).

According to a preferred embodiment, the homogeneous catalytic system that is used in the second oligomerization stage b) is identical to the one that is used in the first oligomerization stage a). In this case, and in a very preferred manner, at least one supplementary activator and/or at least one supplementary additive can advantageously be introduced into the second oligomerization stage b).

In a more preferred manner, the homogeneous catalytic system that is used in oligomerization stage b) is identical to the one that is used in oligomerization stage a) and comprises a zirconium-based catalyst precursor and an ethyl aluminum sesquichloride—based activator. Preferably, at least a second activator and preferably triethyl aluminum (TEA) are introduced into said second oligomerization stage b).

The addition of at least one activator in the second oligomerization stage b) makes it possible to significantly increase the quantity of the C10-C24 olefin fraction that is produced during the second oligomerization stage b) and thus to increase the final yield of middle distillates.

According to another preferred embodiment, the homogeneous catalytic system that is used in the second oligomerization stage b) is different from the one that is used in the first oligomerization stage a). In this case, and in a very preferred manner, at least one catalyst precursor that is selected from among titanium, zirconium, hafnium, nickel and iron, taken by themselves or in a mixture, and/or at least one activator and/or at least one additive, can also be advantageously introduced into the second oligomerization stage b).

The liquid effluent that exits from the second oligomerization stage b) comprises both said olefinic effluent that is produced during the oligomerization stage b), optionally having undergone the drainage stage of the ethylene, and the homogeneous catalytic system(s) used in stages a) and b) that is (are) soluble in the oligomerization products.

The liquid effluent that exits from the second oligomerization stage b) is advantageously sent into a stage for treatment of the catalytic system(s) in which it (they) is (are) neutralized, whereby said stage for treatment of the catalytic system(s) is advantageously followed by a stage for separation of the deactivated catalytic system(s) for obtaining the olefinic effluent that is produced during the second oligomerization stage b) and free of the deactivated homogeneous catalytic system(s).

Treatment of the catalytic system is defined as neutralization and/or separation of the catalytic system of said effluent that exits from the second oligomerization stage b). The stage for neutralization and separation of the homogeneous catalytic system(s) are implemented according to the means known to one skilled in the art.

In a preferred way, neutralization is done advantageously by adding a base or an acid. By way of example, it is possible to cite alcohols, fatty acids, fatty amines, and ammonia. The separation of the catalyst can advantageously be done by washing with an aqueous solution. The catalyst, if it is soluble in the aqueous phase, is advantageously separated from the organic phase by decanting.

In a preferred way, when the catalyst is based on zirconium, its neutralization is advantageously achieved as described in the patents US2009/0314986 or WO2007/016990.

Said olefinic effluent that is produced during the second oligomerization stage b)- and advantageously having undergone stages for treatment and separation of the catalytic system—is next advantageously sent into a separation stage in at least one distillation column in such a way as to obtain at least two fractions that can be incorporated into the gasoline fraction for the fraction that comprises compounds that have between 6 and 10 carbons that can be incorporated in the middle distillate fraction (diesel and/or kerosene) for the fraction that comprises compounds that have between 10 and 24 carbons. A light effluent that for the most part comprises the C4 compounds can also be separated. A heavy fraction that comprises the compounds that have more than 24 carbon atoms can also advantageously be separated. These cited products are in no way restrictive.

At least a portion of the light effluent that comprises the C4 compounds and/or at least a portion of the gasoline fraction that is obtained from the separation stage can advantageously be recycled in the second oligomerization stage b) of the process according to the invention.

With one of the objectives of this invention being to maximize the yield of middle distillate base, said light effluent and the gasoline fraction that are not desired are thus again oligomerized in the second oligomerization stage b) of the process according to the invention, making it possible to increase their molecular weight and thus to increase their boiling point to make them compatible with the desired use.

The oligomerization stages of the process according to the invention are advantageously implemented continuously.

The implementation of the first oligomerization stage may take place in a preferred way in a stirred reactor as described below. The solution that contains the catalytic system is injected into the oligomerization reactor a) that operates in liquid phase at the same time that the C2 ethylene feedstock that is introduced by a valve makes it possible to keep the pressure constant within the reactor. The reactor is a reactor that is stirred by means that are known to one skilled in the art, such as a reactor that is stirred in a mechanical and iosthermic way, cooled by a double jacket or internal coil, or in a preferred manner stirred by external recirculation with recycling that has advantageously been cooled so as to extract the reaction heat. The recycling is inside the oligomerization unit; it is not shown in FIG. 1.

A valve makes it possible to keep the liquid level constant, thus making it possible to extract from the reactor a mass flow rate that is equal to the mass flow rate of fluids that are introduced (catalytic system, C2 ethylene feedstock, and optional recycling).

The first oligomerization stage can advantageously take place in one or more reactors in a series or in parallel.

The implementation of the second oligomerization stage can advantageously take place in any type of reactor such as, for example, the tubular or stirred reactors.

Preferably, the second oligomerization stage is advantageously implemented in a tubular-type reactor where the heat is evacuated by means of a double jacket that covers the tube. The liquid feedstock is advantageously introduced with the activator and/or optionally with at least one additive.

In a particular embodiment of the catalytic reaction for intermittent oligomerization, the solution that contains the catalytic system is injected into the oligomerization reactor a) that operates in the liquid phase at the same time that the C2 ethylene feedstock that is introduced by a valve makes it possible to keep the pressure constant within the reactor. The same types of reactors as for the continuous implementation are used in oligomerization stages a) and b). The products that are formed accumulate in the reactor of stage b) for the required duration of the reaction. After the duration of the reaction, the reactor is then cooled, the catalytic systems are then destroyed by injection of amine, for example, and the products that are obtained are extracted and washed.

During the preparation of the catalytic composition that is used in oligomerization stages a) and b), the metal precursor, the activator and optionally the organic additive can be brought into contact in any order in a solvent that is selected from the group that is formed by the aliphatic and cycloaliphatic hydrocarbons, such as hexane, cyclohexane, heptane, butane or isobutane, by an aromatic hydrocarbon such as benzene, toluene, orthoxylene, mesitylene, ethylbenzene, or by a chlorinated hydrocarbon such as chlorobenzene, pure or in a mixture. The aliphatic hydrocarbons such as n-heptane and the aromatic hydrocarbons such as orthoxylene are advantageously used. The concentration of the metal M that is selected from among titanium, zirconium, hafnium, nickel and iron in the catalytic solution is advantageously between $1.10^{-6}$ and 1 mol/L. The molar ratio between the activator and said metal precursor is advantageously between 1/1 and 1,800/1, preferably 2/1 and 800/1, and in an even more preferred manner between 3/1 and 100/1. The temperature at which the components of the catalytic systems are mixed is advantageously between −10 and 180° C., preferably between 0 and 150° C., for example at a temperature that is close to ambient temperature (15 to 30° C.). The mixing can be carried out under an atmosphere of ethylene or inert gas.

The oligomerization reaction that is described in stages a) and b) according to the invention is advantageously carried out under a total pressure of 0 to 200 bar, preferably 1 to 100 bar, and at a temperature of 20 to 180° C., preferably 40 to 140° C.

Figure 1:
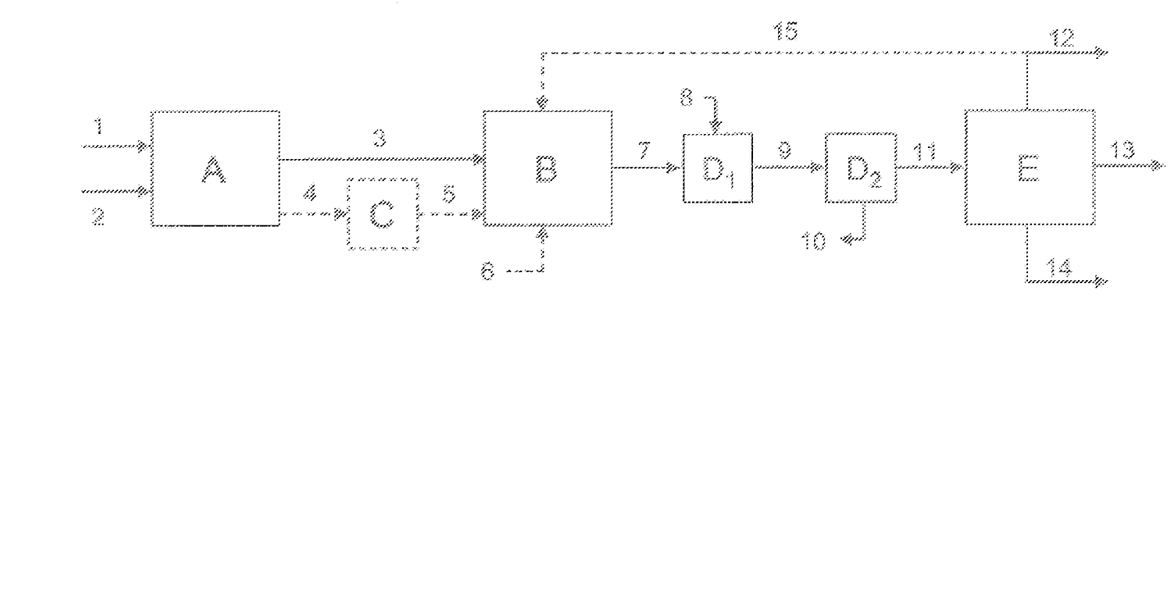
FIG. 1 diagrammatically shows the process for production of bases for fuels (diesel and/or kerosene type) from a C2 ethylene feedstock, whereby said process comprises at least a first oligomerization stage followed by a second oligomerization stage, whereby a stage for draining the ethylene is optionally implemented between said oligomerization stages that work in the presence of an identical or different homogeneous catalytic system.

The C2 ethylene feedstock is introduced into a first reaction zone (A) via the pipe (1) in which said feedstock undergoes a first oligomerization stage. The homogeneous catalytic system that is used in the first reaction zone (A) is introduced via the pipe (2). The hydrocarbon effluent that is produced in the reaction zone (A) exits from the reaction zone (A) via the pipe (3) and is sent into a second reaction zone (B) in which it undergoes a second oligomerization stage in the presence of a homogeneous catalytic system that is identical to or different from the one that is used in the reaction zone (A).

According to a variant of the process of the invention, an activator and/or an additive can be introduced into the reaction zone (B) via the pipe (6) that is shown in dotted lines in the case where the catalytic systems that are used in the reaction zones (A) and (B) are identical. According to another variant of the process of the invention and in the case where the catalytic systems that are used in the reaction zones (A) and (B) are different, a homogeneous catalytic system that is different from the one that is used in the reaction zone (A) and/or at least one activator and/or at least one additive can also be introduced into the second oligomerization stage (B) via the pipe (6) that is shown in dotted lines.

According to a preferred variant of the invention, a zone (C) for draining the ethylene that is shown in dotted lines is employed between the two reaction zones (A) and (B), whereby said zone for draining the ethylene comprises a pipe (4) for the introduction of the effluent that is obtained from the reaction zone (A) and a pipe (5) for the output of the effluent.

In a preferred embodiment, zone B is followed by a zone D (D1 and D2), shown in dotted lines, for treatment of (a) catalytic system(s), comprising a pipe (8) for the introduction of chemical compounds that allow the neutralization of the catalytic system(s) in (D1), a pipe (9) for the introduction of the effluent of (D1) into (D2), and a pipe (10) that allows the output of the deactivated catalytic system(s) of (D2). Zone B is connected to zone D by pipe (7).

Zone (D2) is followed by a zone (E) for separation of the products obtained from the preceding stages, which comprises a pipe (11) for the introduction of the effluent that is obtained from zone (D2), a pipe (12) for the output of products that have between four and ten carbons (gasoline fraction), a pipe (13) for the output of compounds that have between 10 and 24 carbons (kerosene and diesel fraction), and a pipe (14) for the output of the compounds that have more than 24 carbon atoms.

According to an embodiment that is shown in dotted lines, the reaction zone (B) comprises a pipe (15) for the introduction of light olefins that are obtained from separation zone (E).

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application Ser. No. 10/01953, filed May 6, 2010, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The following examples illustrate the invention without limiting its scope.

EXAMPLE 1

For Comparison

This first example describes a test that illustrates the oligomerization of ethylene in a single stage.

In a stainless steel autoclave with a useful volume of 250 ml, equipped with a double jacket that makes it possible to regulate the temperature by circulation of water or oil, the following are introduced in order under argon atmosphere and at ambient temperature: 20 ml of cyclohexane, 3.5 ml of an ortho-xylene solution that contains 0.2 mmol of $ZrCl_4$, and 0.2 mmol of di(2-ethylhexyloxy)-2,2-propane. Next, 1.2 mmol of ethyl aluminum sesquichloride $Al_2Et_3Cl_3$ (EASC), previously solubilized in 2.5 ml of ortho-xylene, or an Al/Zr molar ratio=12, is introduced. The temperature is then brought to 100° C. while introducing ethylene into the autoclave in such a way as to maintain a constant pressure of 3.5 MPa. The reaction is allowed to continue for one hour. After one hour of reaction, the introduction of ethylene is stopped, and the reactor is cooled to 20° C. Then, approximately 1 ml of dodecylamine is injected into the autoclave in such a way as to neutralize the entire catalytic system. The autoclave is then depressurized, and a gaseous fraction and a liquid fraction that are analyzed by chromatography are collected.

The productivity of the system is the product mass formed per gram of initially introduced zirconium. It is measured according to a method that is known to one skilled in the art. The productivity is 1,911 g/g of Zr. The distribution of the olefins that shows the distribution of olefins per number of carbon atoms in the effluent, determined by gas phase chromatography (GPC), as well as the measurement of linearity, per carbon number, of the olefins that are obtained are provided in Table 1.

TABLE 1

Distribution and Linearity of the Olefins that are Obtained

|  | Distribution (% by Weight of Olefins Per Number of Carbon Atoms) | Linearity per Carbon Number (% by Weight) |
| --- | --- | --- |
| C4 | 22.5 | 100 |
| C6 | 26.9 | 96.7 |
| C8 | 16.5 | 93.1 |
| C10 | 10.8 | 84.5 |
| C12 | 7.2 | 77.3 |
| C14 | 5.2 | 71.0 |
| C16 | 3.6 | 64.0 |
| C18 | 2.5 | 59.4 |
| C20 | 1.4 | 53.9 |
| C22 | 0.9 | 49.5 |
| C24 | 0.5 | 43.6 |
| C26 | 0.2 | 49.6 |
| C28 | 0.1 | <50 |
| C30 | 0.1 | <50 |
| C30+ | <0.1 | <50 |

The measurement of linearity per carbon number is carried out by gas phase chromatography on the fraction that is studied after hydrogenation of said fraction.

The mean linearity—expressed in terms of the percentage of the C4-C30 fraction being the ratio of the percentage of linear olefins that are present in the C4-C30 fraction to the total percentage of olefins that are present in the C4-C30 fraction—is 89.1%.

This example demonstrates that a middle distillate fraction can be obtained by oligomerization of the ethylene with the catalytic system and operating conditions that are described above. 32.1% of the oligomers that are obtained are compounds that have between 10 and 24 carbon atoms, compatible with the diesel and kerosene "middle distillate pool." The C10-C24 fraction has a mean linearity of 73.5% expressed in terms of the percentage being the ratio of the percentage of linear olefins that are present in the C10-C24 fraction to the total percentage of olefins that are present in the C10-C24 fraction, which is not a priori compatible with good cold properties of the middle distillates.

EXAMPLE 2

According to the Invention

This example implements the concatenation of the process according to the invention, namely a first oligomerization stage a) followed by a stage for draining ethylene, and then a second oligomerization stage b) in which the catalytic system that is used is identical to the one that is used in the first stage. An activator injection (TEA) is carried out in the second oligomerization stage b) making possible the increase of the yield of middle distillate, as well as the branching of the effluent at the output of said second stage b) and therefore the reduction of its mean linearity, thus making it possible to obtain better cold properties of the middle distillate bases that are obtained.

In order, the following were introduced into the same device as the one that was used in Example 1 under argon atmosphere and at ambient temperature: 20 ml of cyclohexane, 3.5 ml of an ortho-xylene solution that contains 0.2 mmol of $ZrCl_4$, and 0.2 mmol of di(2-ethylhexyloxy)-2,2-propane. Next, 1.2 mmol of ethyl aluminum sesquichloride $Al_2Et_3Cl_3$ (EASC), previously solubilized in 2.5 ml of ortho-xylene, or an Al/Zr molar ratio=12, is introduced. The temperature is then brought to 100° C. while introducing ethylene into the autoclave in such a way as to keep a constant pressure of 3.5 MPa. The reaction is left to continue for one hour.

The distribution of the olefins as well as the measurement of the linearity of the olefins per carbon number in the effluent obtained from the first oligomerization stage obtained are identical to that of Example 1 and are provided in Table 1.

After one hour of reaction, the introduction of ethylene is stopped. At the end of the drainage of ethylene, the residual quantity of ethylene in the effluent is 1% by weight relative to the total mass of olefins that are present in said effluent. 3 ml of a xylene solution that contains 0.8 mmol of triethyl aluminum (TEA) is injected. Stirring is maintained as well as the temperature that is maintained at 100° C. for 4 additional hours. The pressure is also kept constant at 3.5 MPa. The stifling is then stopped, and the reactor is cooled to 20° C. Approximately 1 ml of dodecyalmine is next injected into the autoclave in such a way as to neutralize the entire catalytic system. Next, the autoclave is depressurized, and a gaseous fraction and a liquid fraction that are analyzed by chromatography are collected.

The productivity of the system is 2,733 g/g of Zr. The distribution of olefins, determined by gas phase chromatography (GPC), as well as the measurement of the linearity per fraction of olefins that are obtained are provided in Table 2.

TABLE 2

Distribution and Linearity of the Olefins that are Obtained

| | Distribution (% by Weight of Olefins Per Number of Carbon Atoms) | Linearity per Carbon Number (% by Weight) |
|---|---|---|
| C4 | 8.2 | 100 |
| C6 | 9.8 | 82.5 |
| C8 | 10.9 | 53.5 |
| C10 | 10.8 | 40.7 |
| C12 | 9.9 | 33.6 |
| C14 | 8.7 | 27.3 |
| C16 | 7.5 | 23.5 |
| C18 | 6.8 | 19.3 |
| C20 | 5.4 | 18.9 |
| C22 | 4.7 | 17.3 |
| C24 | 3.6 | 13.1 |
| C26 | 3.5 | 14.6 |
| C28 | 2.1 | <15 |
| C30 | 2.1 | <15 |
| C30+ | 5.0 | <15 |

The mean linearity that is expressed in terms of percentage of the C4-C30 fraction, being the ratio of the percentage of linear olefins that are present in the C4-C30 fraction to the total percentage of olefins that are present in the C4-C30 fraction, is 41.2%.

57.4% of the oligomers obtained are compounds that have between 10 and 24 carbon atoms, compatible with the diesel and kerosene "middle distillate pool." It is therefore noted that the concatenation of stages according to the invention makes it possible to increase the yield of middle distillate base (C10-C24 fraction) (57.4%). This C10-C24 fraction further exhibits a mean linearity of 27%, which is much less than the mean linearity that is obtained in Example 1, at the end of a single oligomerization stage.

The second oligomerization stage b) therefore makes it possible to promote the shift of the distribution of olefins to the C10-C24 fraction and to reduce its mean linearity in such a way as to make them capable of being incorporated in the diesel and/or kerosene fuel bases 5 (cetane number of the diesel fraction is greater than 60).

This reduction of the mean linearity makes possible an improvement of the cold properties of the middle distillate fraction that is obtained (cloud point=−11° C.; boundary temperature of filterability=−11° C.).

The invention claimed is:

1. A process for the preparing a base for a diesel and/or kerosene fuel from a C2 ethylene feedstock, comprising
at least a first stage a) for oligomerization of said feedstock into at least one hydrocarbon effluent that comprises a mixture of olefins that for the most part have between 4 and 30 carbons, which olefin mixture comprises a C10-C24 fraction that has a mean linearity that is greater than 60%, in the presence of a homogeneous catalytic system that comprises at least one, zirconium-based catalyst precursor, and also comprises at least one activator that is selected from the group consisting of ethyl aluminum sesquichloride, dichloroethyl aluminum, dichloroisobutyl aluminum, chlorodiethyl aluminum, triethyl aluminum, and trimethyl aluminum,
a second stage b) for oligomerization of at least a portion of the effluent that is obtained from stage a), into at least one hydrocarbon effluent that comprises a mixture of olefins that for the most part have between 4 and 30 carbon atoms, which olefin mixture comprises a C10-C24 fraction that has a mean linearity that is less than 50%, in the presence of a homogeneous catalytic system that is identical to the one that is used in stage a), and at least one supplementary activator, which is triethyl aluminum, is introduced into the second oligomerization stage, and wherein a stage for draining ethylene is provided to control the amount of ethylene entering stage b), said stage being between the first and second oligomerization stages a) and b) and provides at least one effluent that comprises a residual quantity of ethylene that is less than 5% by weight relative to the total mass of the hydrocarbons that are present in said effluent, which effluent is then sent to stage b).

2. The process according to claim 1, in which the C2 ethylene feedstock comes from dehydration of ethanol produced from a renewable source that is obtained from biomass.

3. The process according to claim 2, wherein an activator in stage a) is an ethyl aluminum sesquichloride-based activator.

4. The process according to claim 2, in which a liquid effluent that exits from the second oligomerization stage b) is sent into a stage for treatment of the catalytic system in which it is neutralized, which stage for treatment of the catalytic system is followed by a stage for separation of a deactivated catalytic system for producing said olefinic effluent that is produced during the oligomerization stage b) that is free of the catalytic system.

5. The process according to claim 2, in which the olefinic effluent that is produced during the second oligomerization stage b) is sent into a separation stage in at least one distillation column in such a way as to obtain at least one light effluent that for the most part comprises the C4 compounds, a gasoline fraction, and a middle distillate fraction, which is diesel and/or kerosene.

6. The process according to claim 5, in which at least a portion of the light effluent that comprises the C4 compounds and/or at least a portion of the gasoline fraction that is obtained from the separation stage are recycled in the second oligomerization stage b).

7. The process according to claim 2, in which the first and the second oligomerization stages are at a temperature of between 20° C. and 180° C., and at a pressure of between 0 and 20 MPa.

8. The process according to claim 1, wherein an activator in stage a) is an ethyl aluminum sesquichloride-based activator.

9. The process according to claim 8, in which a liquid effluent that exits from the second oligomerization stage b) is sent into a stage for treatment of the catalytic system in which it is neutralized, which stage for treatment of the catalytic system is followed by a stage for separation of a deactivated catalytic system for producing said olefinic effluent that is produced during the oligomerization stage b) that is free of the catalytic system.

10. The process according to claim 8, in which the olefinic effluent that is produced during the second oligomerization stage b) is sent into a separation stage in at least one distillation column in such a way as to obtain at least one light effluent that for the most part comprises the C4 compounds, a gasoline fraction, and a middle distillate fraction, which is diesel and/or kerosene.

11. The process according to claim 10, in which at least a portion of the light effluent that comprises the C4 compounds and/or at least a portion of the gasoline fraction that is obtained from the separation stage are recycled in the second oligomerization stage b).

12. The process according to claim 8, in which the first and the second oligomerization stages are at a temperature of between 20° C. and 180° C., and at a pressure of between 0 and 20 MPa.

13. The process according to claim 1, in which a liquid effluent that exits from the second oligomerization stage b) is sent into a stage for treatment of the catalytic system in which it is neutralized, which stage for treatment of the catalytic system is followed by a stage for separation of a deactivated catalytic system for producing said olefinic effluent that is produced during the oligomerization stage b) that is free of the catalytic system.

14. The process according to claim 13, in which the olefinic effluent that is produced during the second oligomerization stage b) is sent into a separation stage in at least one distillation column in such a way as to obtain at least one light effluent that for the most part comprises the C4 compounds, a gasoline fraction, and a middle distillate fraction, which is diesel and/or kerosene.

15. The process according to claim 14, in which at least a portion of the light effluent that comprises the C4 compounds and/or at least a portion of the gasoline fraction that is obtained from the separation stage are recycled in the second oligomerization stage b).

16. The process according to claim 13, in which the first and the second oligomerization stages are at a temperature of between 20° C. and 180° C., and at a pressure of between 0 and 20 MPa.

17. The process according to claim 1, in which the olefinic effluent that is produced during the second oligomerization stage b) is sent into a separation stage in at least one distillation column in such a way as to obtain at least one light effluent that for the most part comprises the C4 compounds, a gasoline fraction, and a middle distillate fraction, which is diesel and/or kerosene.

18. The process according to claim 17, in which at least a portion of the light effluent that comprises the C4 compounds and/or at least a portion of the gasoline fraction that is obtained from the separation stage are recycled in the second oligomerization stage b).

19. The process according to claim 1, in which the first and the second oligomerization stages are at a temperature of between 20° C. and 180° C., and at a pressure of between 0 and 20 MPa.

20. A process according to claim 1, wherein the zirconium-based metal precursor is selected from the group consisting of zirconium halides, zirconium tetrachloride $ZrCl_4$, zirconium tetrabromide $ZrBr_4$, zirconium alcoholates, zirconium tetrapropylate $Zr(OC_3H_7)_4$, zirconium tetrabutylate $Zr(OC_4H_9)_4$, zirconium carboxylates, zirconium tetra-ethyl-2-hexanoate $Zr(OCOC_7H_{15})_4$, zirconium oxocarboxylates, and dizirconium 1-oxo-hexaethyl-2-hexanoate $[Zr(OCOC_7H_{15})_3]_2O$.

* * * * *